(12) United States Patent
You et al.

(10) Patent No.: US 9,915,767 B2
(45) Date of Patent: Mar. 13, 2018

(54) POLARIZER AND DISPLAY DEVICE HAVING THE SAME

(71) Applicant: Samsung Display Co., Ltd., Yongin-Si, Gyeonggi-Do (KR)

(72) Inventors: Junwoo You, Seongnam-si (KR); Donghoon Kim, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/184,210

(22) Filed: Jun. 16, 2016

(65) Prior Publication Data
US 2017/0139094 A1    May 18, 2017

(30) Foreign Application Priority Data

Nov. 12, 2015  (KR) .................. 10-2015-0159024

(51) Int. Cl.
| | |
|---|---|
| *F21V 9/14* | (2006.01) |
| *G02B 5/30* | (2006.01) |
| *F21V 8/00* | (2006.01) |
| *G02F 1/1335* | (2006.01) |

(52) U.S. Cl.
CPC ......... *G02B 5/3041* (2013.01); *G02B 6/0055* (2013.01); *G02B 6/0056* (2013.01); *G02B 6/0065* (2013.01); *G02B 6/0083* (2013.01); *G02F 1/133528* (2013.01); *G02F 2201/121* (2013.01); *G02F 2201/123* (2013.01)

(58) Field of Classification Search
CPC ......... F21V 9/14; F21S 48/114; G02B 6/0056
USPC ........................................... 362/19
See application file for complete search history.

(56) References Cited

U.S. PATENT DOCUMENTS

| | | | |
|---|---|---|---|
| 2009/0115943 A1 | 5/2009 | Gaides | |
| 2015/0062497 A1* | 3/2015 | Nam ................ | G02F 1/133536 349/96 |
| 2015/0277185 A1* | 10/2015 | Nam ................ | G02F 1/133512 349/58 |

FOREIGN PATENT DOCUMENTS

| | | |
|---|---|---|
| KR | 1020110079136 A | 7/2011 |
| KR | 101281323 B1 | 6/2013 |

* cited by examiner

*Primary Examiner* — Ahshik Kim
(74) *Attorney, Agent, or Firm* — Cantor Colburn LLP

(57) ABSTRACT

A display device includes a display panel which displays an image with light, a backlight unit which generates and provides the light to the display panel, and a polarizer which is coupled to the display panel and includes a polarizing film to polarize the light. The polarizing film includes a base film defining a first optical surface thereof from which first grooves are defined recessed and a second optical surface thereof which opposes the first optical surface and from which second grooves are defined recessed; a polarizing layer including the first grooves recessed from the first optical surface; and a light blocking layer including the second grooves recessed from the second optical surface.

20 Claims, 9 Drawing Sheets

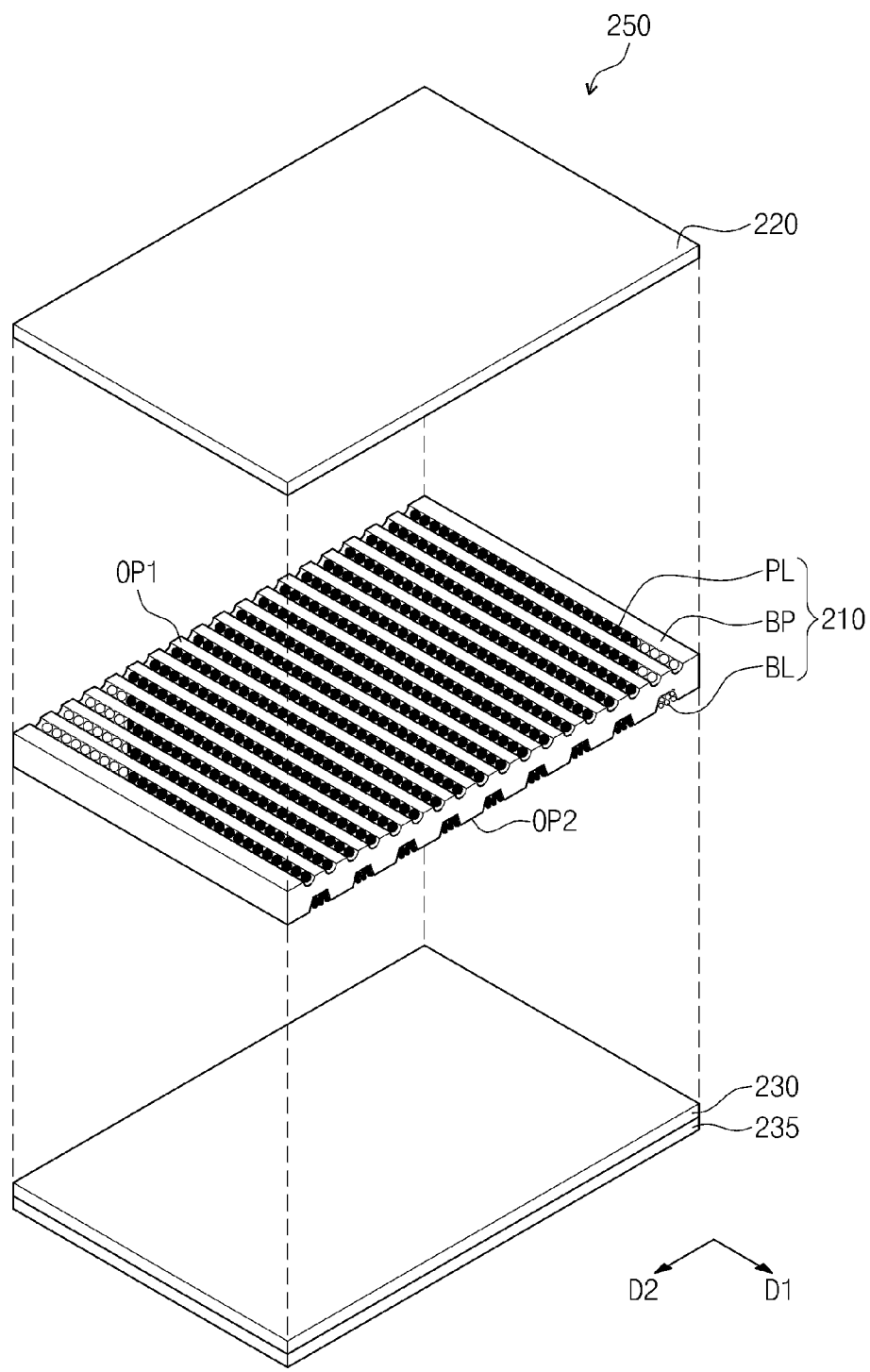

POLARIZER AND DISPLAY DEVICE HAVING THE SAME

This application claims priority to Korean Patent Application No. 10-2015-0159024, filed on Nov. 12, 2015, and all the benefits accruing therefrom under 35 U.S.C. § 119, the contents of which in their entirety are herein incorporated by reference.

BACKGROUND

1. Field

The invention relates to a polarizer and a display device having the same. More particularly, the invention relates to a polarizer having both polarizing and condensing functions and a display device having the same.

2. Description of the Related Art

A display device, such as a liquid crystal display, includes a backlight unit and a liquid crystal display panel which displays an image using a light provided from the backlight unit. The backlight unit includes a light emitting unit, a light guide plate, and optical sheets controlling a path of the light exiting from the light guide plate.

The light guide plate guides the light provided from the light emitting unit to the liquid crystal display panel. The optical sheets include a diffusion sheet and a prism sheet. The diffusion sheet diffuses the light exiting from the light guide plate and the prism sheet condenses the light exiting from the light guide plate toward a front direction of the liquid crystal display panel.

In addition, polarizers are respectively attached to front and rear surfaces of the liquid crystal display panel. The polarizers have absorption axes substantially perpendicular to each other and each of the polarizers linearly polarizes the light provided from the light emitting unit.

SUMMARY

One or more exemplary embodiment of the invention provides a polarizer having both polarizing and condensing functions.

One or more exemplary embodiment of the invention provides a display device including the polarizer having both polarizing and condensing functions.

Exemplary embodiments of the invention provide a polarizer including a polarizing film, a first support film attached to a first surface of the polarizing film, and a second support film attached to a second surface of the polarizing film opposing the first surface to dispose the polarizing film between the first and second support films.

The polarizing film includes a base film defining a first optical surface thereof from which first grooves are defined recessed and a second optical surface thereof which opposes the first optical surface and from which second grooves are defined recessed; a polarizing layer including the first grooves recessed from the first optical surface; and a light blocking layer including the second grooves recessed from the second optical surface.

Exemplary embodiments of the invention provide a display device includes a display panel which displays an image, a backlight unit which generates and provides the light to the display panel, and a polarizer which is coupled to the display panel and includes a polarizing film to polarize the light from the backlight unit.

The polarizing film includes a base film defining a first optical surface thereof from which first grooves are defined recessed and a second optical surface thereof which opposes the first optical surface and from which second grooves are defined recessed; a polarizing layer including the first grooves recessed from the first optical surface; and a light blocking layer including the second grooves recessed from the second optical surface.

According to one or more exemplary embodiment of the invention, the polarizing film of the polarizer may have both polarizing and condensing functions. Therefore, although the display device does not include a separate optical component, e.g., a condensing film, a contrast ratio of the light exiting from the display panel may be improved by the polarizer in the front (e.g., viewing side) direction of the display panel.

In addition, since the polarizing film and the condensing film are integrally formed with each other within the single member polarizer, optical components of the display device may be simplified and an overall volume and thickness of the display device may be reduced.

BRIEF DESCRIPTION OF THE DRAWINGS

The above and other advantages of the present disclosure will become readily apparent by reference to the following detailed description when considered in conjunction with the accompanying drawings where:

FIGS. 2A and 2B are exploded perspective views showing exemplary embodiments of a polarizer of the display device shown in FIG. 1B according to the invention;

DETAILED DESCRIPTION

Figure 1A:
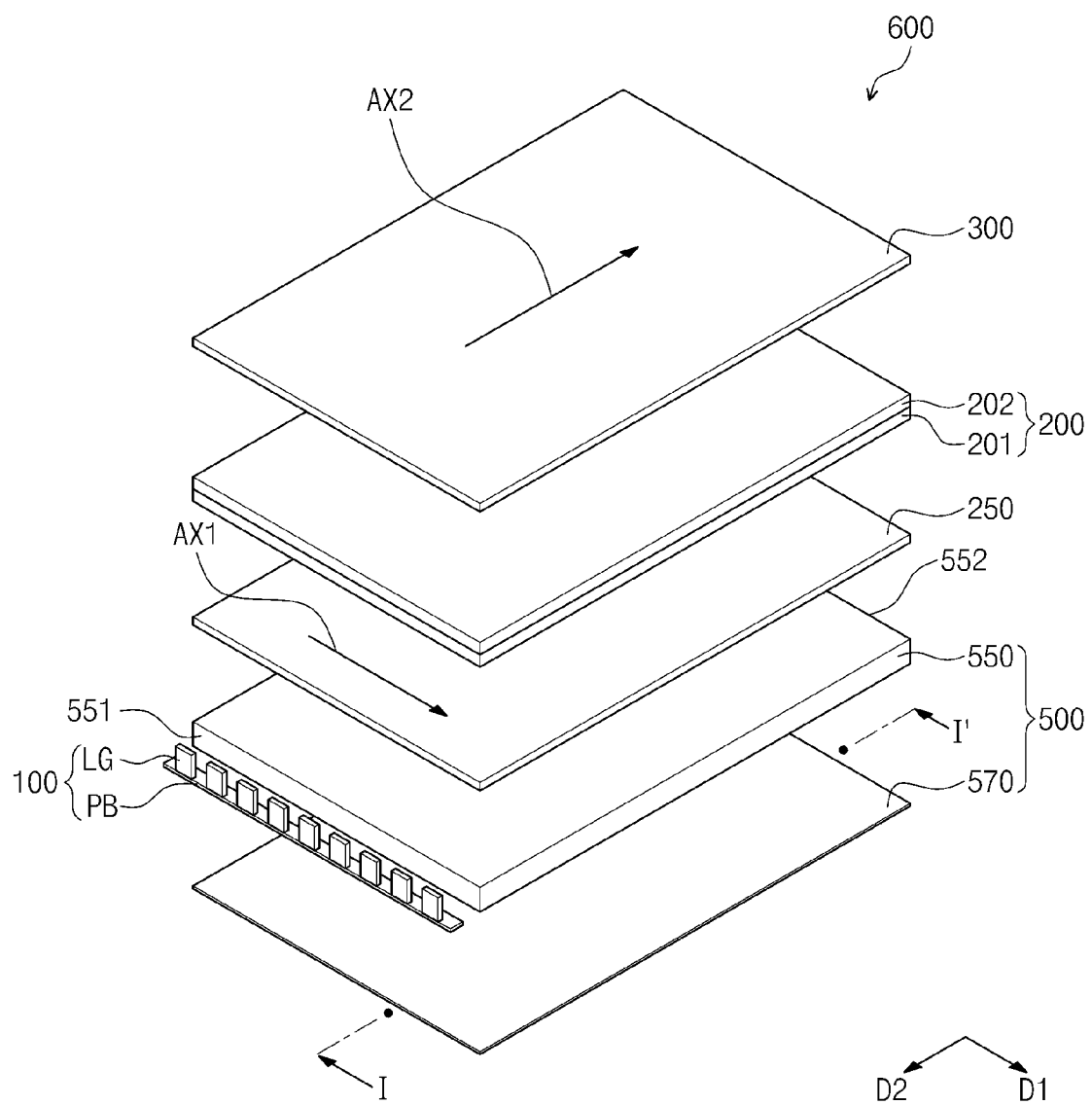
FIG. 1A is an exploded perspective view showing an exemplary embodiment of a display device according to the invention.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness. The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents. Like numerals refer to like elements throughout.

The use of the terms first, second, etc. do not denote any order or importance, but rather the terms first, second, etc. are used to distinguish one element from another.

It will be understood that when an element such as a layer, film, region, or substrate is referred to as being "on" another element, it can be directly on the other element or intervening elements may also be present. In contrast, when a layer, film, region, or substrate is referred to as being "directly on" another element, there are no intervening elements present.

It is to be understood that the singular forms "a," "an," and "the" include plural forms, including "at least one," unless the context clearly dictates otherwise. "At least one" is not to be construed as limiting "a" or "an". "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be explained in detail with reference to the accompanying drawings.

Figure 1B:
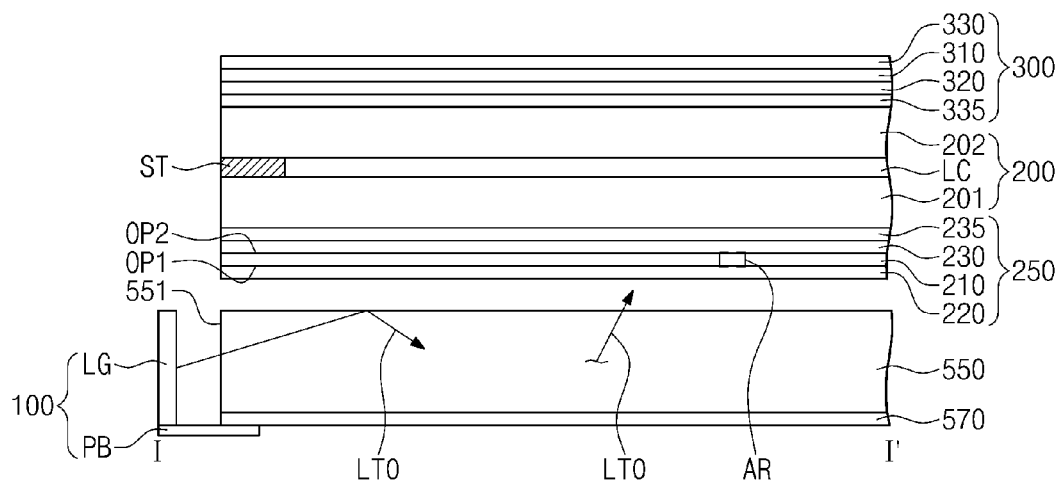
FIG. 1B is a cross-sectional view of the display device taken along line I-I' shown in FIG. 1A.
Figure 1C:
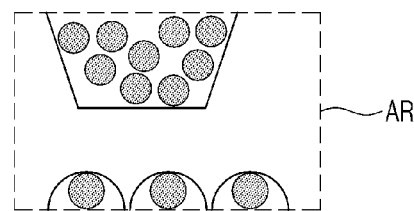
FIG. 1C is an enlarged view of an inner area of the display device shown in FIG. 1B.

FIG. 1A is an exploded perspective view showing an exemplary embodiment of a display device 600 according to the invention, FIG. 1B is a cross-sectional view of the display device taken along line I-I' shown in FIG. 1A, and FIG. 1C is an enlarged view of an inner area of the display device shown in FIG. 1B.

Referring to FIGS. 1A, 1B and 1C, the display device 600 includes a display panel 200, a backlight unit 500, a first polarizer 250 and a second polarizer 300.

The display panel 200 displays an image using a light LT0 provided from the backlight unit 500. The display panel 200 includes a first display substrate 201, a second display substrate 202, a coupling member ST and a liquid crystal layer LC. The first and second display substrates 201 and 202 face each other. The liquid crystal layer LC is interposed between the first and second display substrates 201 and 202. The coupling member ST is disposed between the first and second display substrates 201 and 202 to correspond to an edge of the first and second display substrates 201 and 202, and the first and second display substrates 201 and 202 are coupled to each other by the coupling member ST.

The first display substrate 201 includes a plurality of pixel electrodes (not shown) disposed in a plurality of pixel areas and the second display substrate 202 includes a common electrode (not shown) facing the pixel electrodes, but the structure of the first and second display substrates 201 and 202 should not be limited thereto or thereby. In another exemplary embodiment, for instance, the second display substrate 202 does not include the common electrode and the first display substrate 201 may include the common electrode in addition to the pixel electrodes.

The backlight unit 500 includes a light emitting unit 100, a reflective member 570 and a light guide member 550.

The light emitting unit 100 includes a driving circuit board PB and a light source LG provided in plural mounted on the driving circuit board PB. The light sources LG generate and emit the light LT0 in response to a power source voltage provided from the driving circuit board PB. The driving printed circuit board PB defines a length thereof which is larger than a width thereof. In the illustrated exemplary embodiment, the driving circuit board PB lengthwise extends in a first direction D1 and is disposed adjacent to a first side portion of the light guide member 550 and the light sources LG are arranged in the first direction D1. Accordingly, the light LT0 is incident to the light guide member 550 through an incident side surface 551 thereof defined at the first side portion of the light guide member 550.

In the illustrated exemplary embodiment, each of the light sources LG may be, but not limited to, a light emitting diode package. According to another exemplary embodiment, the backlight unit 500 may further include additional light emitting unit disposed at a second side portion of the light guide member 550 which is opposite to the first side portion thereof. Accordingly, the light LT0 from the additional light emitting unit would be incident to the light guide member 550 through a side surface 552 thereof opposite to the side surface 551.

The reflective member 570 has a light reflective property and the light guide member 550 is disposed on the reflective member 570. The light LT0 exiting through a rear surface of the light guide member 550 facing the reflective member 570 is reflected by the reflective member 570 and incident to the light guide member 550. Light exits from the light guide member 550 through a light exit surface thereof opposite to the rear surface. Side surfaces of the light guide member 550 connect the rear surface and the light exit surface to each other. The side surfaces 551 and 552 described above are two among the side surfaces of the light guide member 550 which connect the rear surface and the light exit surface to each other.

The reflective member 570 has an overall sheet shape with a total thickness in a range from a few micrometers to hundreds of micrometers. The reflective member 570 may be a sheet separate from the light guide member 550. According to another exemplary embodiment, the reflective member 570 may instead be defined by a reflective material coated on the rear surface of the light guide member 550 such that the reflective member 570 is not a sheet separate from the light guide member 550.

In the illustrated exemplary embodiment, the light guide member 550 includes a polymer material, such as polyethylene terephthalate ("PET"), polymethyl methacrylate ("PMMA"), polycarbonate ("PC"), etc., and has a substantially plate shape such as having a relatively large cross-sectional thickness for ease of description, but should not be limited thereto or thereby. For instance, according to another embodiment, the light guide member 550 may have a flexible film shape including the polymer material for which the cross-sectional thickness is smaller than that of the plate shape and is relatively small as compared to the planar size thereof.

The first polarizer 250 is attached to the first display substrate 201 and faces the liquid crystal layer LC such that the first display substrate 201 is disposed between the first polarizer 250 and the liquid crystal layer LC. The first polarizer 250 includes a first polarizing film 210, a first support film 220, a second support film 230 and a first adhesive layer 235. The first polarizer 250 has a first absorption axis AX1 substantially parallel to the first direction D1 and absorbs a light vibrating in a direction corresponding to the first absorption axis AX1 among the light LT0 to linearly polarize the light LT0.

The first polarizing film 210 includes or defines a first optical surface OP1 and a second optical surface OP2 which faces the first optical surface OP1. The light LT0 exiting from the light guide member 550 is incident to the first polarizing film 210 after passing through the first optical surface OP1 and the incident light LT0 exits the first polarizing film 210 through the second optical surface OP2.

The first polarizing film 210 is disposed between the first and second support films 220 and 230. The first polarizing film 210 performs both polarizing and condensing functions on the light LT0 while the light LT0 passes through the first polarizer 250 along the above-mentioned path.

An inner area AR of the first polarizing film 210 has a structure as described below. The first polarizing film 210 includes a polarizing layer PL (refer to FIG. 3) to perform the polarizing function on the light LT0 and includes a light blocking layer BL (refer to FIG. 3) to perform the condensing function on the light LT0. Since the first polarizing film 210 has the condensing function, a traveling direction of the light LT0 passing through the first polarizer 250 may be closer to the front direction of (e.g., a direction perpendicular to) the display panel 200 and the light LT0 traveling in a diagonal or inclined direction with respect to the front direction may be extinguished or become extinct. Therefore, a contrast ratio of an image viewable in the front direction of the display panel 200 may be improved.

The first support film 220 is attached to the first optical surface OP1 of the first polarizing film 210 to support thereon other layers of the first polarizing film 210. In addition, the second support film 230 is attached to the second optical surface OP2 of the first polarizing film 210 to support thereon the other layers of the first polarizing film 210. In more detail, the first optical surface OP1 is supported by the first support film 220 and the second optical surface OP2 is supported by the second support film 230. Thus, although the first polarizing film 210 has a total thickness in a range from a few micrometers to hundreds of micrometers, deformation of the first polarizing film 210 may be reduced or effectively prevented by the first and second support films 220 and 230 even where an external environment or an external impact is applied to the first polarizing film 210.

In the illustrated exemplary embodiment, each of the first and second support films 220 and 230 has a non-optical property (e.g., does not change or alter light or a traveling path thereof) and includes triacetyl cellulose ("TAC"). Light may be transmitted through the first and second support films 220 and 230 having the non-optical property.

According to another exemplary embodiment, other films may be attached to the first polarizing film 210 instead of the first and second support films 220 and 230 described above. In an exemplary embodiment, for instance, a light retardation film may be attached to the second optical surface OP2 of the first polarizing film 210 instead of the second support film 230.

The first adhesive layer 235 is disposed between the first display substrate 201 and the second support film 230 and the second support film 230 is adhered to the first display substrate 201 by the first adhesive layer 235. In the illustrated exemplary embodiment, the first adhesive layer 235 has a non-optical property and includes a pressure sensitive adhesive material.

The second polarizer 300 is attached to the second display substrate 202 and faces the liquid crystal layer LC such that the second display substrate 202 is disposed between the second polarizer 300 and the liquid crystal layer LC. The second polarizer 300 linearly polarizes the light which has sequentially passed through the first polarizer 250 and the display panel 200. In more detail, the second polarizer 300 has a second absorption axis AX2 substantially parallel to a second direction D2 which is substantially perpendicular to the first direction D1 and absorbs a light vibrating in a direction corresponding to the second absorption axis AX2 among the light which has sequentially passed through the first polarizer 250 and the display panel 200.

In the illustrated exemplary embodiment, the second polarizer 300 includes a second polarizing film 310, a third support film 320, a fourth support film 330 and a second adhesive layer 335.

The second polarizing film 310 is disposed between the third and fourth support films 320 and 330 and linearly polarizes the light which sequentially passed through the first polarizer 250 and the display panel 200.

The third and fourth support films 320 and 330 are attached to the second polarizing film 310 to support the second polarizing film 310. In the illustrated exemplary embodiment, each of the third and fourth support films 320 and 330 has a non-optical property and includes triacetyl cellulose ("TAC").

The second adhesive layer 335 is disposed between the second display substrate 202 and the third support film 320 to adhere the third support film 320 to the second display substrate 202. The second adhesive layer 335 has the non-optical property and includes a pressure sensitive adhesive material.

Hereinafter, the structure and function of the first polarizer 250 will be described in detail.

Figure 2A:
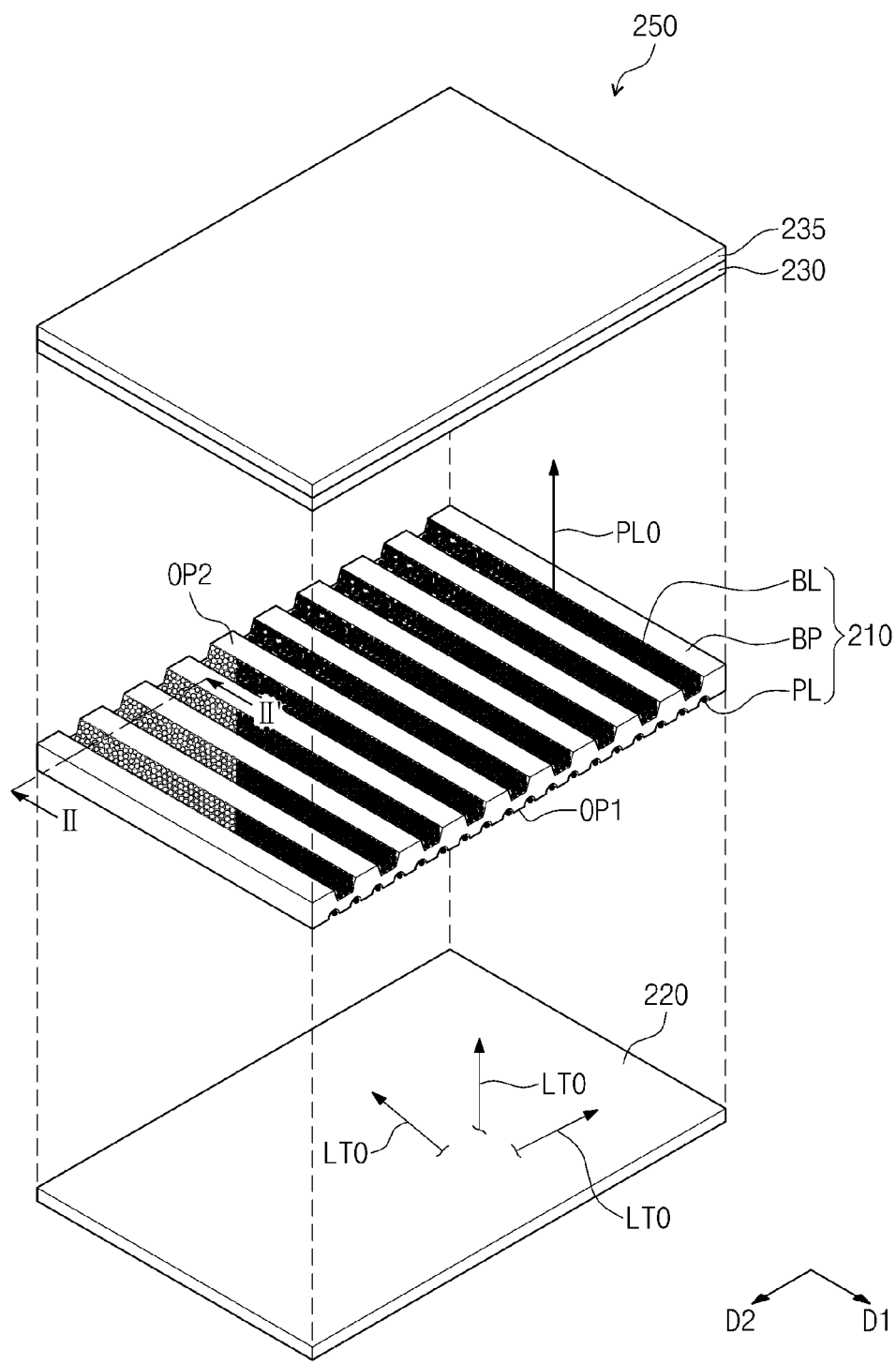
Figure 3:
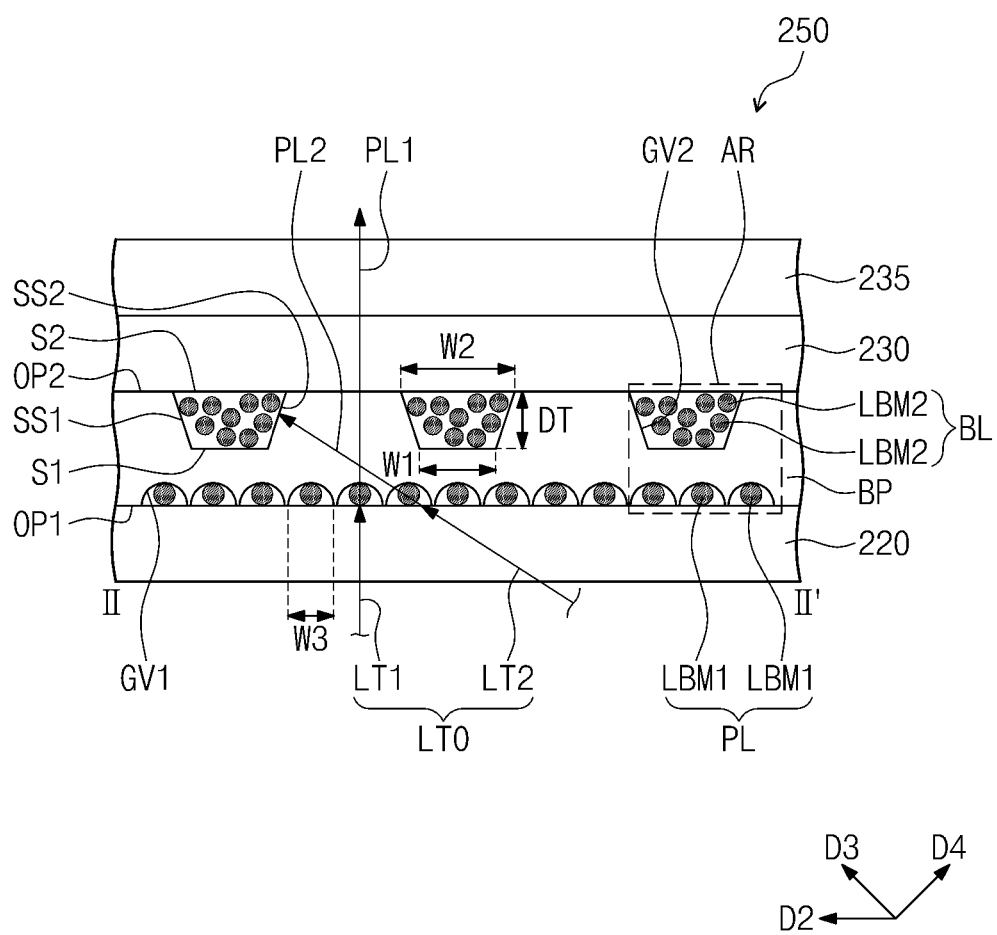
FIG. 3 is a cross-sectional view of the polarizer taken along line II-II' shown in FIG. 2A.

FIGS. 2A and 2B are exploded perspective views showing exemplary embodiments of a first polarizer 250 shown in FIGS. 1B and 1C, and FIG. 3 is a cross-sectional view of the polarizer taken along line II-II' shown in FIG. 2A. In more detail, the polarizing film 210 is disposed such that the second optical surface OP2 faces upward in FIG. 2A, and the polarizing film 210 is disposed such that the first optical surface OP1 faces upward in FIG. 2B.

Referring to FIGS. 2A, 2B, and 3, the first polarizer 250 includes the polarizing film 210, the first support film 220, the second support film 230 and the first adhesive layer 235 and the polarizing film 210 includes a base film BP, a polarizing layer PL and a light blocking layer BL.

The base film BP includes or defines the first optical surface OP1 and the second optical surface OP2 which opposes the first optical surface OP1. In addition, the base film BP is coupled to the first support film 220 at the first optical surface OP1 and coupled to the second support film 230 at the second optical surface OP2.

In the illustrated exemplary embodiment, the base film BP may be, but not limited to, a polyvinyl alcohol ("PVA") film.

The polarizing layer PL is disposed on or at the first optical surface OP1. In more detail, a first groove GV1 is provided in plural defined at or recessed from the first optical surface OP1, and portions of the polarizing layer PL is accommodated in the first grooves GV1 thereof.

The polarizing layer PL includes a first light absorbing material portion (LBM1 in a groove GV1) provided in plural and each of the first light absorbing material portions has disposed therein a first light absorbing material LBM1. The first light absorbing material LBM1 may fill each of the first grooves GV1 which defines the first light absorbing material portion (LBM1 in a groove GV1). In addition, since the first support film 220 is adhered to the first optical surface OP1, the first light absorbing material LBM1 filled in each first groove GV1 is sealed by the first support film 220.

In the illustrated exemplary embodiment, the first light absorbing material LBM1 includes iodine or iodine compound, but should not be limited thereto or thereby. That is, according to another exemplary embodiment, the first light absorbing material LBM1 may include a material different from the iodine or iodine compound, e.g., dichroic dye.

In the illustrated exemplary embodiment, each of the first grooves GV1 defines a length thereof which is larger than a width thereof. The first grooves GV1 define a longitudinal (length) direction in the first direction D1 in a top plan view, and thus the first light absorbing material accommodated in the first grooves GV1 is aligned or arranged in the first direction D1. Accordingly, a light vibrating in the first direction D1 among the light LT0 provided from the backlight unit 500 (refer to FIG. 1A) is absorbed by the first light absorbing material LBM1 and linearly polarized. In an exemplary embodiment, for instance, when the light LT0 in a natural state is incident to the first polarizing film 210 after passing through the first optical surface OP1 thereof, the light LT0 is linearly polarized by the polarizing layer PL of the first polarizing film 210, and thus a linearly-polarized light PL0 exits through the second optical surface OP2.

The light blocking layer BL is disposed on or at the second optical surface OP2. In more detail, a second groove GV2 is provided in plural defined at or recessed from the second optical surface OP2, and portions of the light blocking layer BL are accommodated in the second grooves GV2 thereof. In the illustrated exemplary embodiment, each of the second grooves GV2 of the light blocking layer BL defines a length thereof which is larger than a width thereof. The second grooves GV2 defines a longitudinal (length) direction in the first direction D1 in a top plan view. Lengths of the first grooves GV1 and/or the second grooves GV2 may continuously extend an entirety of the base film BP in the first direction D1, while the grooves are arranged in the second direction D2.

The light blocking layer BL further includes or is defined by a second light absorbing material LBM2 in a second groove GV2 and each second groove GV2 may be is filled with the second light absorbing material LBM2. In addition, since the second support film 230 is attached to the second optical surface OP2, the second light absorbing material LBM2 accommodated in the second grooves GV2 is sealed by the second support film 230.

In the illustrated exemplary embodiment, the second light absorbing material LBM2 includes the same composition material as that of the first light absorbing material LBM1. Therefore, as described above, where the first light absorbing material LBM1 includes iodine or iodine compound, the second light absorbing material LBM2 may include iodine or iodine compound.

According to an exemplary embodiment of a manufacturing method of the light blocking layer BL and the polarizing layer PL, the base film BP is elongated (e.g., in a length direction thereof) in the first direction D1 to form the first grooves GV1 in the first optical surface OP1. In addition, the base film BP is etched from the second optical surface OP2 by a predetermined depth DT to form the second grooves GV2. Then, the base film BP in which the first and second grooves GV1 and GV2 are formed is dipped in an aqueous solution containing the light absorbing material, and as a result, the first and second grooves GV1 and GV2 are filled with the light absorbing material, thereby forming the light blocking layer BL and the polarizing layer PL.

In the illustrated exemplary embodiment, the first and second light absorbing materials LBM1 and LBM2 include the same material, but the first and second light absorbing materials LBM1 and LBM2 may include different light absorbing materials. In an exemplary embodiment, for instance, the second light absorbing material LBM2 may include a carbon black.

When viewed in a cross section, a width of each second groove GV2 of the light blocking layer BL increases as a distance from the second optical surface OP2 decreases, and decreases as a distance from the first optical surface OP1 increases. In more detail, the light blocking layer BL includes or defines a lower surface S1 thereof which is defined by a corresponding bottom among bottoms of the second grooves GV2, an upper surface S2 coplanar with the second optical surface OP2, making contact with the second support film 230 and facing the lower surface S1, and first and second side surfaces SS1 and SS2 connecting the lower surface S1 and the upper surface S2 to each other. The lower surface S1 has a first width W1 smaller than a width W2 of the upper surface S2. What is referred to as an upper surface S2 may be defined by a distance between the first and second side surfaces SS1 and SS2 at the second optical surface OP2, where the second groove GV2 is exposed to outside the first polarizing film 210. Alternatively, the upper surface S2 may be considered a collection of upper surfaces of the second light absorbing material LBM2 at the second optical surface OP2.

In addition, since the light blocking layer BL defines a tapered shape thereof when viewed in a cross section, each of the first and second side surfaces SS1 and SS2 is inclined with respect to the lower surface S1 and the upper surface S2. In more detail, the first side surface SS1 is substantially parallel to a third direction D3 when viewed in a cross section and the second side surface SS2 is substantially parallel to a fourth direction D4 when viewed in a cross section. Where the first and second direction D1 and D2 define a plane, the third and fourth directions D3 and D4 are inclined with respect to this plane.

In the illustrated exemplary embodiment, each of the second grooves GV2 defines the longitudinal direction in the first direction D1 and defines the predetermined depth DT from the second optical surface OP2. That is, each of the second grooves GV2 has a trench shape defined in the base film BP which extends partially through a thickness of the base film BP without penetrating through the base film BP, and thus the predetermined depth DT is smaller than a total thickness of the base film BP.

In addition, each of the second grooves GV2 has a width greater than that of each of the first grooves GV1. In the illustrated exemplary embodiment, a maximum width of each of the second grooves GV2 may be substantially equal to the second width W2 and a minimum width of each of the second grooves GV2 may be substantially equal to the first width W1. A maximum width of each of the first grooves GV1 may be substantially equal to a third width W3. Here, each of the first and second widths W1 and W2 may be greater than the third width W3. Accordingly, owing to the shapes and relative dimensions of the light blocking layer BL and the polarizing layer PL, the first light absorbing material LBM1 is aligned in the first direction D1 in each of the first grooves GV1, but the second light absorbing material LBM2 is randomly distributed in the first direction D1 in each of the second grooves GV2 without being directed to a specific direction.

Hereinafter, the polarizing function of the first polarizer 250 will be described in detail. The light LT0 is output from the backlight unit 500 (refer to FIG. 1A). For the convenience of explanation, when assuming that the light LT0 include a first light LT1 and a second light LT2, the first light LT1 travels in the front direction with respect to each of the first polarizer 250 and the display panel 200 (refer to FIG. 1A), and the second light LT2 travels in the diagonal direction of the front direction with respect to each of the first polarizer 250 and the display panel.

The first and second lights LT1 and LT2 are linearly polarized by passing through the polarizing layer PL. That is, the first and second lights LT1 and LT2 randomly travel since they exist in the natural state before passing through the polarizing layer PL, but the first and second lights LT1 and LT2 are converted to first and second linearly-polarized lights PL1 and PL2 after passing through the polarizing layer PL. The first and second linearly-polarized lights PL1 and PL2 or just the first linearly-polarized light PL1 may be represented by PL0 in FIG. 2A.

As described above, since portions of the polarizing layer PL lengthwise extend in the first direction D1 and the first polarizer 250 has the first absorption axis AX1 (refer to FIG. 1A) in the first direction D1, a light component vibrating in the first direction D1 among each of the first and second lights LT1 and LT2 may be absorbed by the polarizing layer PL.

Hereinafter, the condensing function of the first polarizer 250 having the above-mentioned structure will be described in detail. The first and second linearly-polarized lights PL1 and PL2 are absorbed by the light blocking layer BL or exit to outside the first polarizer 250 through the second optical surface OP1 according to a traveling direction thereof. In more detail, similar to the path of the first linearly-polarized light PL1 shown in FIG. 3, the first linearly-polarized light PL1 sequentially passes through a portion of the base film BP disposed between two second grooves GV2 of the light blocking layer BL adjacent to each other and through the second optical surface OP2 to exit outside the first polarizer 250. However, different from the first linearly-polarized light PL1, the second linearly-polarized light PL2 reaches the second groove GV2 of the light blocking layer BL and then is extinct or extinguished (absorbed) by the light blocking layer BL.

Therefore, since a probability in which the first linearly-polarized light PL1 is incident to the display panel 200 through the first polarizer 250 is higher than that of the second linearly-polarized light PL2, a viewing angle of the image displayed by the display panel 200 may be closer to the front direction of the display panel 200 in accordance with the path of the first linearly-polarized light PL1. In addition, since the light LT0 traveling in the diagonal direction of the front direction is extinguished as the second linearly-polarized light PL2, the contrast ratio in the front direction of the display panel 200 may be improved.

Figure 4:
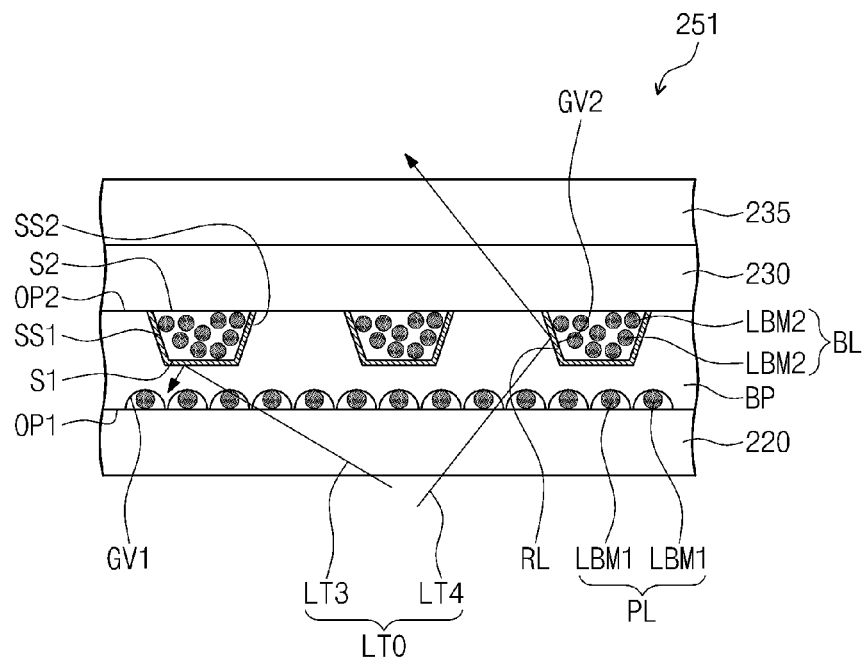
FIG. 4 is a cross-sectional view showing another exemplary embodiment of a polarizer according to the invention.

FIG. 4 is a cross-sectional view showing another exemplary embodiment of a polarizer 251 according to the invention. In FIG. 4, the same reference numerals denote the same elements in the previously described exemplary embodiment, and thus detailed descriptions of the same elements will be omitted.

Referring to FIG. 4, the polarizer 251 is attached to one surface of the display panel to perform the polarizing and condensing functions as the polarizer 250 (refer to FIG. 3) described with reference to FIG. 3.

In the illustrated exemplary embodiment, the polarizer 251 includes a base film BP, a polarizing layer PL, a light blocking layer BL and a reflective layer RL.

The reflective layer RL has a light reflective property. The reflective layer RL is accommodated in the second grooves GV2 defined in the base film BP and disposed between the base film BP and the light absorbing material LBM2 in the second grooves GV2 of the light blocking layer BL. The reflective layer RL includes a metal material, e.g., silver (Ag) or aluminum (Al).

When the light LT0 generated by the backlight unit 500 (refer to FIG. 1A) includes a third light LT3 and a fourth slight LT4 according to a traveling direction thereof, the third light LT3 is reflected by the reflective layer RL. In the previous exemplary embodiment described with reference to FIG. 3, the first light LT1 (refer to FIG. 3) is absorbed by the light blocking layer BL (refer to FIG. 3), but the third light LT3 is reflected by the reflective layer RL disposed between the base film BP and the light absorbing material LBM2 in the second grooves GV2 of the light blocking layer BL in FIG. 4. In addition, the third light LT3 reflected by the reflective layer RL may exit the polarizer 251 through the first support film 220 to be eventually reflected by the reflective member 570 (refer to FIG. 1A) of the backlight unit 500 (refer to FIG. 1A) to be re-incident to the polarizer 251.

As described above, the direction in which the third slight LT3 travels may be changed while the third light LT3 is reflected between the reflective layer RL and the reflective member. 570 For instance, after the third light LT3 is reflected by the reflective member, the light path of the third light LT3 is changed and the third light LT3 may be eventually converted to the fourth light LT4. In addition, the fourth light LT4 may pass through a portion of the base film BP disposed between two second grooves GV2 of the light blocking layer BL adjacent to each other and through the second optical surface OP2.

Accordingly, an amount of the light of the light LT0 absorbed by the light blocking layer BL is reduced by the reflective layer RL and an amount of the light exiting through the second optical surface OP2 of the polarizer 251 may be increased. In addition, although a portion of the third light LT3 transmits through the reflective layer RL, the third light LT3 transmitting through the reflective layer RL is absorbed by the light absorbing material LBM2 in the second grooves GV2 of the light blocking layer BL, and thus the polarizer 251 may have the condensing function of the first polarizer 250 (refer to FIG. 3) described with reference to FIG. 3.

In addition, due to the structure of the light blocking layer BL defining the tapered shape of the second grooves GV2, a width between two second grooves GV2 of the light blocking layer BL adjacent to each other is reduced as a distance from the second optical surface OP2 decreases. Therefore, since a width of the light path through which the fourth light LT4 travels becomes small as the fourth light LT4 travels between the two second grooves GV2 of the light blocking layer BL adjacent to each other, the condensing effect of the fourth light LT4 exiting through the polarizer 251 may be improved.

Figure 5:
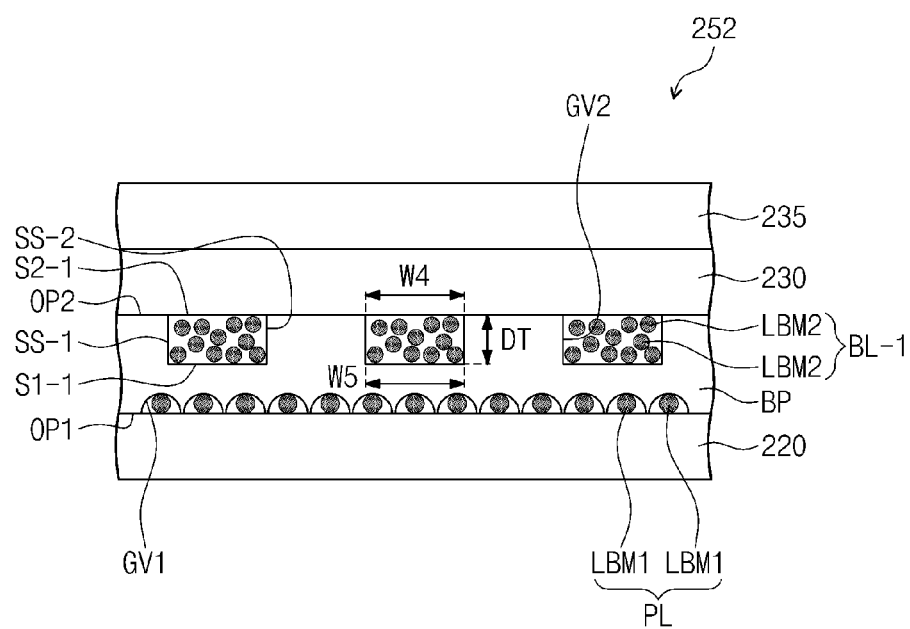
FIG. 5 is a cross-sectional view showing still another exemplary embodiment of a polarizer according to the invention.

FIG. 5 is a cross-sectional view showing still another exemplary embodiment of a polarizer 252 according to the invention. In FIG. 5, the same reference numerals denote the same elements in the previously described exemplary embodiments, and thus detailed descriptions of the same elements will be omitted.

Referring to FIG. 5, the polarizer 252 is attached to one surface of the display panel to have the polarizing and condensing functions as the polarizer 250 (refer to FIG. 3) described with reference to FIG. 3.

In the illustrated exemplary embodiment, the polarizer 252 includes a base film BP, a polarizing layer PL and a light blocking layer BL-1.

The light blocking layer BL-1 defines a lower surface S1-1 thereof, an upper surface S2-1 thereof, a first side surface SS-1 thereof and a second side surface SS-2 thereof. What is referred to as an upper surface S2-1 may be defined by a distance between the first and second side surfaces SS-1 and SS-2 at the second optical surface OP2, where the second groove GV2 is exposed to outside the first polarizing film. Alternatively, the upper surface S2-1 may be considered a collection of upper surfaces of the second light absorbing material LBM2 at the second optical surface OP2.

The upper surface S2-1 has or defines a fourth width W4 that is the same as a fifth width W5 of the lower surface S1-1. Thus, each of the first and second side surfaces SS-1 and SS-2 may be substantially perpendicular to the upper surface S2-1 and the lower surface S1-1.

As described above, where each of the second grooves GV2 of the light blocking layer BL-1 has a rectangular shape when viewed in a cross section, the polarizer 252 may have the polarizing function that polarizes the light provided from the backlight unit 500 (refer to FIG. 1A) using the polarizing layer PL as the polarizer 250 (refer to FIG. 3) described with reference to FIG. 3. In addition, since the light traveling in a diagonal direction with respect to a front direction of the polarizer 252 is extinct or extinguished by the light blocking layer BL-1, an amount of the light exiting from the polarizer 252 toward the front direction may be more increased than an amount of the light exiting from the polarizer 252 toward the diagonal direction.

Figure 6A:
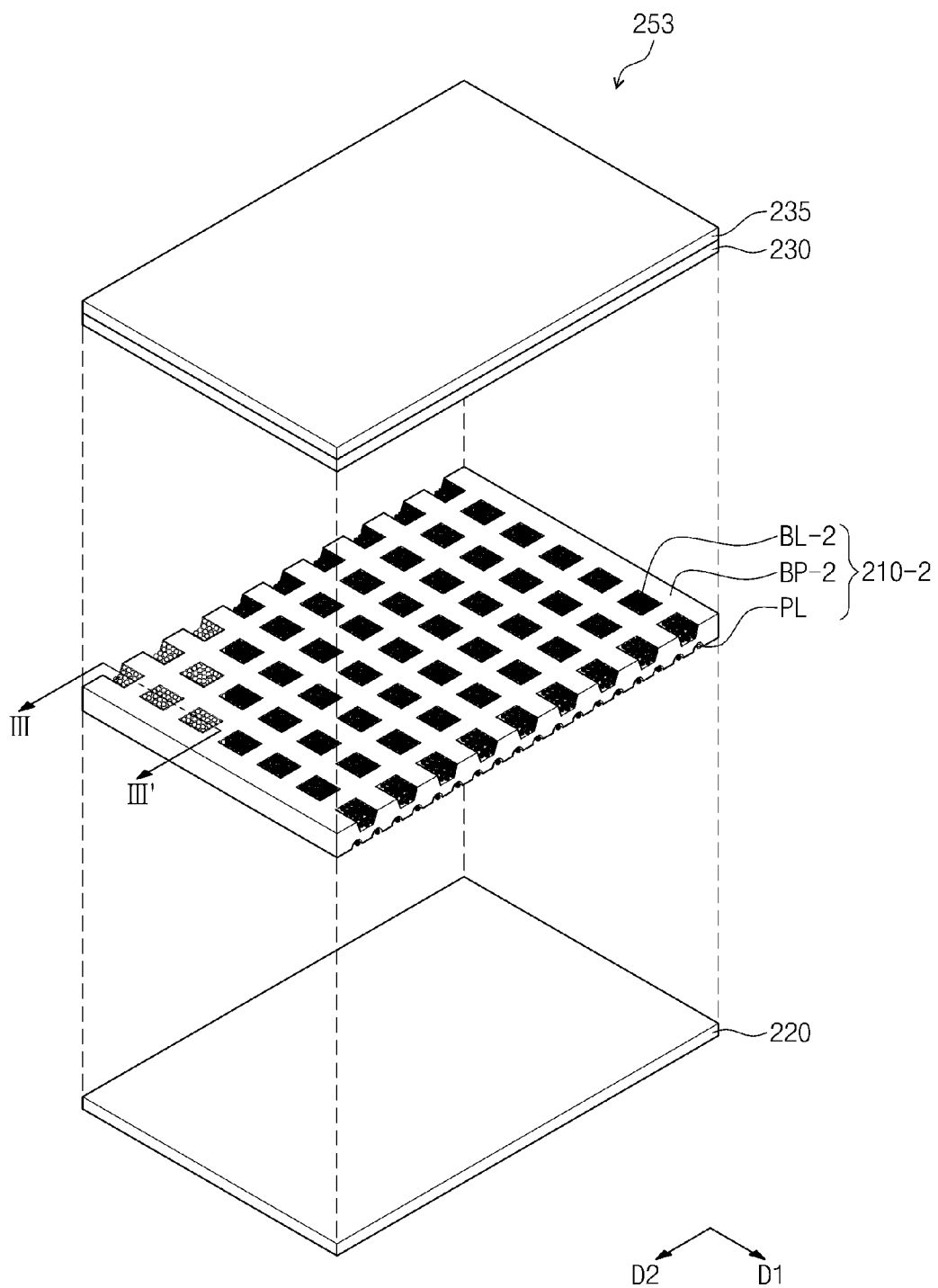
FIG. 6A is an exploded perspective view showing yet another exemplary embodiment of a polarizer according to the invention.
Figure 6B:
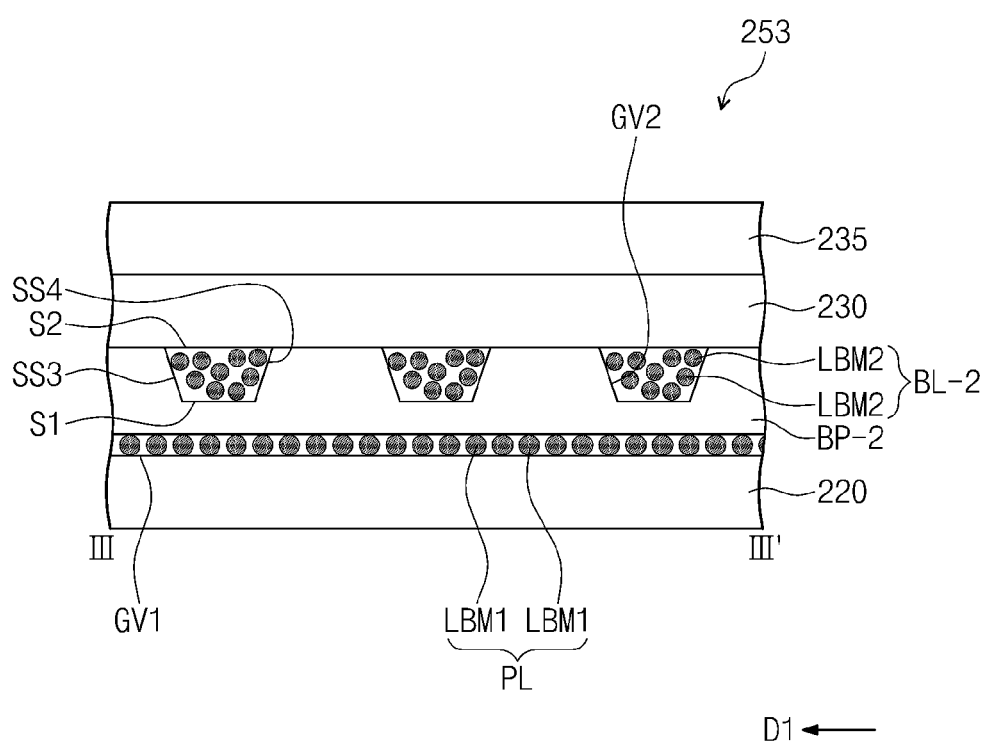
FIG. 6B is a cross-sectional view of the polarizer taken along line III-III' of FIG. 6A.

FIG. 6A is an exploded perspective view showing yet another exemplary embodiment of a polarizer 253 according to the invention and FIG. 6B is a cross-sectional view taken along line III-III' of FIG. 6A. In FIGS. 6A and 6B, the same reference numerals denote the same elements in the previously described exemplary embodiments, and thus detailed descriptions of the same elements will be omitted.

Referring to FIGS. 6A and 6B, the polarizer 253 is attached to one surface of the display panel to have polarizing and condensing functions. The polarizer 253 includes a first polarizing film 210-2, a first support film 220, a second support film 230 and a first adhesive layer 235.

In the illustrated exemplary embodiment, the first polarizing film 210-2 includes a base film BP-2, a polarizing layer PL and a light blocking layer BL-2.

In the embodiment described with reference to FIGS. 2A and 2B, each of the second grooves GV2 by which the light blocking layer BL is defined (refer to FIGS. 2A and 2B) has a continuous line shape in the first direction D1, but each of the second grooves GV2 by which the light blocking layer BL-2 is defined has a discrete shape provide in plural spaced apart from each other in the first direction D1 shown in FIG. 6A. The second grooves GV2 by which the light blocking layer BL-2 is define are spaced apart from each other and arranged in a matrix shape in the first and second directions D1 and D2.

The light blocking layer BL-2 is defined with the second grooves GV2. In detail, the second light absorbing material LBM2 is filled in each of the second grooves GV2 to define the light blocking layer BL-2.

In the illustrated exemplary embodiment, the light blocking layer BL-2 includes or defines a lower surface S1 thereof, an upper surface S2 thereof, a third side surface SS3 thereof and a fourth side surface SS4 thereof, and the third and fourth side surfaces SS3 and SS4 face each other in the first direction D1. The light blocking layer BL-2 has or defines a tapered shape in which a width in the first direction decreases as a distance from the lower surface S1 decreases. Accordingly, the third and fourth side surfaces SS3 and SS4 extend to be inclined towards each other when viewed in a cross section and are inclined with respect to the lower surface S1 and the upper surface S2. What is referred to as an upper surface S2 may be defined by a distance between the third and fourth side surfaces SS3 and SS4 at the second optical surface OP2, where the second groove GV2 is exposed to outside the first polarizing film 210-2. Alternatively, the upper surface S2 may be considered a collection of upper surfaces of the second light absorbing material LBM2 at the second optical surface OP2.

Although not shown in FIG. 6B, the light blocking layer BL-2 may further include or define a first side surface and a second side surface which faces the first side surface in the second direction D2. Similar to the first and second side surfaces SS1 and SS2 (refer to FIG. 3) of the light blocking layer BL (refer to FIG. 3), the first and second side surfaces of the light blocking layer BL-2 extend toward each other and are inclined with respect to the lower surface S1 and the upper surface S2.

Figure 7:
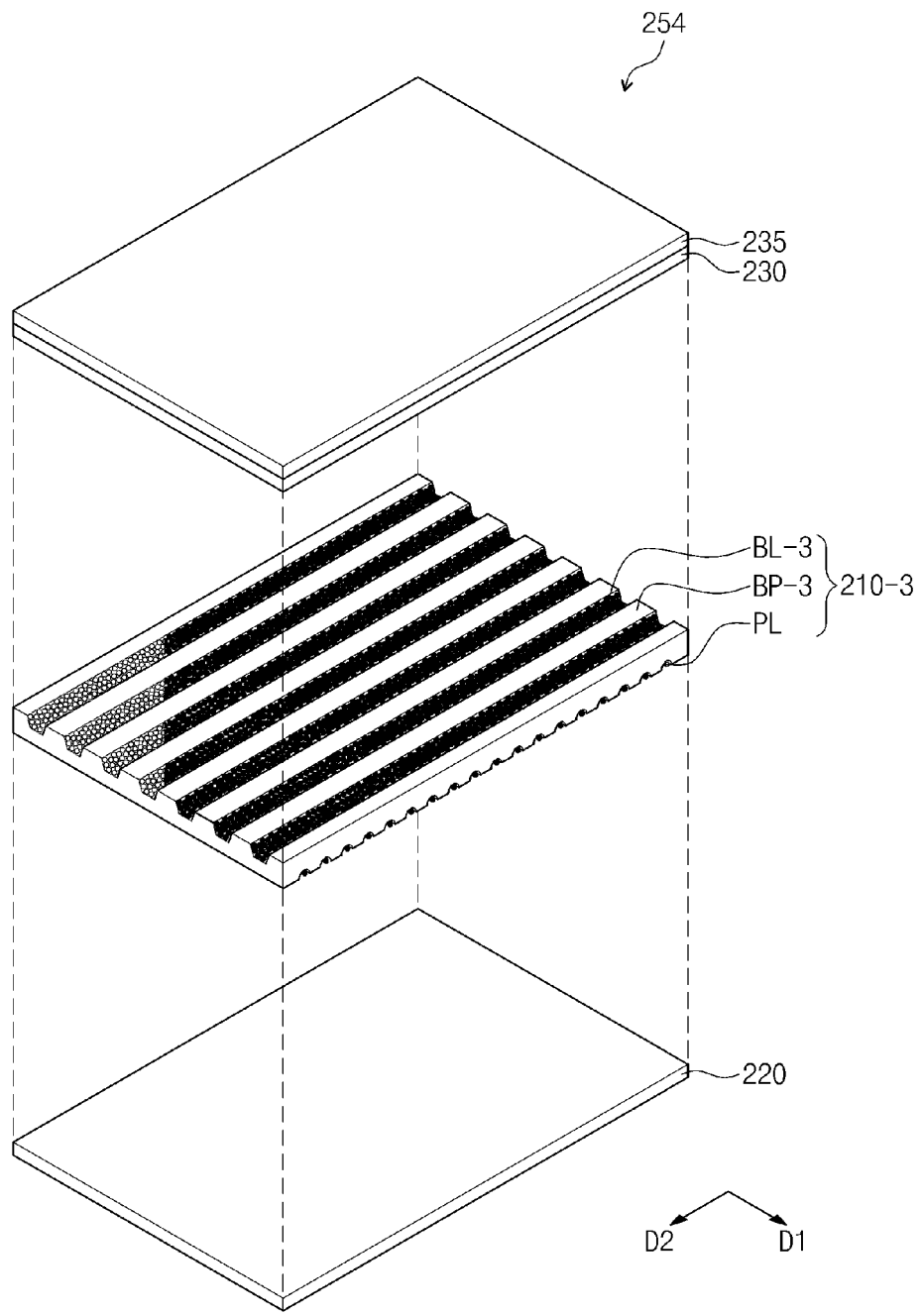
FIG. 7 is an exploded perspective view showing yet another exemplary embodiment of a polarizer according to the invention.

FIG. 7 is an exploded perspective view showing yet another exemplary embodiment of a polarizer 254 according to the invention. In FIG. 7, the same reference numerals denote the same elements in the previously described embodiments, and thus detailed descriptions of the same elements will be omitted.

Referring to FIG. 7, the polarizer 254 is attached to the display panel to have polarizing and condensing functions. The polarizer 254 includes a first polarizing film 210-3, a first support film 220, a second support film 230 and a first adhesive layer 235.

In the illustrated exemplary embodiment, the first polarizing film 210-3 includes a base film BP-3, a polarizing layer PL and light blocking layer BL-3.

When comparing the polarizer 254 shown in FIG. 7 with the polarizer 250 shown in FIG. 2A, a direction in which the first grooves of the polarizing layer PL (refer to FIG. 7) extends is substantially the same as the direction in which the first grooves GV1 of the polarizing layer PL (refer to FIG. 2A) extends. However, each of the second grooves GV2 by which the light blocking layer BL shown in FIG. 2A is defined continuously extends in the first direction D1, but each of the second grooves by which the light blocking layer BL-3 shown in FIG. 7 is defined continuously extends in the second direction D2 which crosses the first direction D1.

As described above, where the longitudinal (length) direction of the second grooves by which the light blocking layers BL and BL-3 (refer to FIG. 2A and FIG. 7) are defined is changed, a direction in which the light from the backlight unit is condensed by the respective light blocking layer may be controlled. When the first direction D1 is referred to as a vertical direction and the second direction D2 is referred to as a horizontal direction, a contrast ratio of the front surface of the display panel with respect to the horizontal direction may be improved by the polarizer 250 shown in FIG. 2A, and a contrast ratio of the front surface of the display panel with respect to the vertical direction may be improved by the polarizer 254 shown in FIG. 7.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
   a display panel which displays an image with light;
   a backlight unit which generates and provides the light to the display panel; and
   a polarizer which is coupled to the display panel and comprises a polarizing film to polarize the light from the backlight unit,
   wherein the polarizing film comprises:
      a base film defining a first optical surface thereof from which first grooves are defined recessed and a second optical surface thereof which opposes the first optical surface and from which second grooves are defined recessed;
      a polarizing layer including the first grooves recessed from the first optical surface; and
      a light blocking layer including the second grooves recessed from the second optical surface.

2. The display device of claim 1, wherein each of the second grooves has a width greater than a width of each of the first grooves.

3. The display device of claim 2, wherein
   a length of each of the first grooves extends to define a longitudinal direction of the polarizing film, and
   the polarizing layer further comprises a first light absorbing material which is accommodated in the first grooves and aligned along the longitudinal direction.

4. The display device of claim 3, wherein the light blocking layer further comprises a second light absorbing material which is accommodated in the second grooves and is distributed in each of the second grooves.

5. The display device of claim 4, wherein the first light absorbing material comprises a same composition material as the second light absorbing material.

6. The display device of claim 4, wherein each of the first light absorbing material and the second light absorbing material comprises iodine.

7. The display device of claim 4, wherein the polarizer further comprises:
   a first support film attached to the first optical surface of the polarizing film to seal the first light absorbing material accommodated in each of the first grooves; and
   a second support film attached to the second optical surface of the polarizing film to seal the second light absorbing material accommodated in each of the second grooves.

8. The display device of claim 3, wherein
   the light blocking layer further comprises a second light absorbing material which is accommodated in the second grooves and is distributed in each of the second grooves, and
   in a top plan view,
      the polarizer has an absorption axis,
      the longitudinal direction of the polarizing film is parallel to the absorption axis of the polarizer, and
      a length of each of the second grooves in which the second light absorbing material is accommodated to define the light blocking layer is parallel to the absorption axis of the polarizer.

9. The display device of claim 3, wherein
   the light blocking layer further comprises a second light absorbing material which is accommodated in the second grooves and is distributed in each of the second grooves, and
   in a top plan view,
      the polarizer has an absorption axis,
      the longitudinal direction of the polarizing film is parallel to the absorption axis of the polarizer, and
      a length of each of the second grooves in which the second light absorbing material is accommodated to define the light blocking layer crosses the absorption axis of the polarizer.

10. The display device of claim 3, wherein
   the light blocking layer further comprises a second light absorbing material which is accommodated in the second grooves and is distributed in each of the second grooves, and
   in a top plan view,
      the polarizer has an absorption axis which extends in a first direction, and
      the second grooves in which the second light absorbing material is accommodated to define the light blocking layer are disposed spaced apart from each other in the first direction and in a second direction which crosses the first direction.

11. The display device of claim 2, wherein along a thickness of the polarizer, each of the second grooves has a depth smaller than a total thickness of the base film.

12. The display device of claim 11, wherein along the thickness of the polarizer,
the light blocking layer is disposed between the display panel and the polarizing layer, and
a width of each of the second grooves of the light blocking layer has a width which increases as a distance from the second optical surface of the base film decreases.

13. The display device of claim 12, wherein each second groove among the second grooves of the light blocking layer comprises:
a lower surface which corresponds to a bottom of the second groove;
an upper surface opposing the lower surface and having a width greater than a width of the lower surface;
a first side surface connecting the upper surface to the lower surface; and
a second side surface opposing the first side surface and connecting the upper surface to the lower surface,
wherein the first and second side surfaces are inclined with respect to the upper and lower surfaces, and the first side surface is inclined in a direction toward the second side surface.

14. The display device of claim 11, wherein each second groove among the second grooves of the light blocking layer comprises:
a lower surface which corresponds to a bottom of the second groove;
an upper surface opposing the lower surface;
a first side surface connecting the upper surface to the lower surface; and
a second side surface opposing the first side surface and connecting the upper surface to the lower surface,
wherein the upper surface has a width equal to a width of the lower surface, and the first and second side surfaces are perpendicular to the upper surface and the lower surface.

15. The display device of claim 1, wherein
the polarizing film further comprises reflective layers respectively accommodated in the second grooves and disposed between the base film and the light blocking layers.

16. A polarizer comprising:
a polarizing film;
a first support film attached to a first surface of the polarizing film; and
a second support film attached to a second surface of the polarizing film opposite to the first surface to dispose the polarizing film between the first and second support films,
wherein the polarizing film comprises:
a base film defining a first optical surface thereof from which first grooves are defined recessed and a second optical surface thereof which opposes the first optical surface and from which second grooves are defined recessed;
a polarizing layer including the first grooves recessed from the first optical surface; and
a light blocking layer including the second grooves recessed from the second optical surface.

17. The polarizer of claim 16, wherein
each of the second grooves has a width greater than a width of each of the first grooves, and
along a thickness of the polarizer, the each of the second groves has a depth smaller than a total thickness of the base film.

18. The polarizer of claim 17, wherein
a length of each of the first grooves extends to define a longitudinal direction of the polarizing film, and
the polarizing layer further comprises a first light absorbing material which is accommodated in the first grooves, the first light absorbing material aligned along the longitudinal direction of the polarizing film, and
the light blocking layer further comprises a second light absorbing material which is accommodated in the second grooves and distributed in each of the second grooves.

19. The polarizer of claim 18, wherein the first light absorbing material and the second light absorbing material comprise a same composition material.

20. The polarizer of claim 19, wherein each second groove among the second grooves of the light blocking layer comprises:
a lower surface which corresponds to a bottom of the second groove;
an upper surface opposing the lower surface and having a width greater than a width of the lower surface;
a first side surface connecting the upper surface to the lower surface; and
a second side surface opposing the first side surface and connecting the upper surface to the lower surface,
wherein the first and second side surfaces are inclined with respect to the upper and lower surfaces, and the first side surface is inclined in a direction toward the second side surface.

* * * * *